United States Patent
Schafheutle et al.

(10) Patent No.: US 6,211,286 B1
(45) Date of Patent: Apr. 3, 2001

(54) BINDERS FOR SOFT FEEL COATING MATERIALS

(75) Inventors: Markus A. Schafheutle; Martin Gerlitz, both of Graz; Anton Arzt, Tillmitsch; Julius Burkl, Graz; Joerg Wango, Wundschuh; Martina Glettler, Graz, all of (AT)

(73) Assignee: Solutia Austria GmbH, Werndorf (AT)

( * ) Notice: Subject to any disclaimer, the term of this patent is extended or adjusted under 35 U.S.C. 154(b) by 0 days.

(21) Appl. No.: 09/483,592

(22) Filed: Jan. 14, 2000

(30) Foreign Application Priority Data

Jan. 18, 1999 (AT) .......................................................... 54/99

(51) Int. Cl.⁷ ............................ C08L 69/00; C08L 75/00; C08F 234/02
(52) U.S. Cl. ........................ 524/591; 525/327.2; 525/381; 525/382; 526/269; 524/602
(58) Field of Search .................... 524/591; 525/327.2, 525/381, 382; 526/269

(56) References Cited

U.S. PATENT DOCUMENTS

| 2,930,779 | * | 3/1960 | Drechsel | 526/269 |
| 4,543,376 | * | 9/1985 | Schupp et al. | 525/381 |
| 4,758,615 | | 7/1988 | Engel et al. | |
| 4,806,611 | * | 2/1989 | Hönel et al. | 528/370 |
| 4,882,391 | * | 11/1989 | Brindöpke et al. | 525/382 |
| 5,567,527 | | 10/1996 | Webster et al. | |

FOREIGN PATENT DOCUMENTS

| 0 669 352 A1 | 2/1994 | (DE) . |
| 97/23516 | 7/1997 | (WO) . |

* cited by examiner

*Primary Examiner*—Tae Yoon
(74) *Attorney, Agent, or Firm*—Frommer Lawrence & Haug LLP

(57) ABSTRACT

Aqueous binders for soft feel materials, comprising predominantly aliphatic, water-soluble or water-dispersible polymers A having terminal or lateral cyclic carbonate groups and an amine B having at least two primary amino groups, the ratio of the number of primary amino groups in the component B to the number of cyclic carbonate groups in the component A being from 7:3 to 3:7.

13 Claims, No Drawings

BINDERS FOR SOFT FEEL COATING MATERIALS

RELATED APPLICATION

This application claims priority of Austrian Application No. A 54/99 filed, Jan. 18, 1999, herein incorporated by reference.

BACKGROUND OF THE INVENTION

In the coating of hard substrates, such as plastics, there is frequently a desire for the coating to achieve a soft feel, where the coated surface, although feeling soft to the touch, is unimpaired in terms of the mechanical and chemical resistance in comparison with the conventional coatings.

Binders for these so-called soft feel coating materials preferably have segments of polymers having a low glass transition temperature; the crosslinking density must be high enough for there to be very little or no reduction in the mechanical and chemical resistance properties but low enough to allow the effect of the low glass transition temperature to be manifested macroscopically as well.

Two-component binders have been disclosed for soft feel coating materials based on hydroxyl-containing polyester urethanes, which are to be cured preferably with isocyanates but also, for example, with acid anhydrides or amino resins.

It has not proven possible to date to provide practicable one-component binders for soft feel coating materials. Although crosslinking with amino resins is able to take place at elevated temperature in the manner of a one-component system, the soft surface of the soft feel coating is adversely affected by the high temperatures required.

The known, polyisocyanate-based systems which cure at room temperature have the problems typical of isocyanates of limited pot life and poor acceptability from the standpoint of occupational hygiene. A further important disadvantage of isocyanate curing agents in conjunction with soft feel coating materials is the "aftercuring" which is observed. Because of the presence of water (which is itself able to react with the isocyanates), the polyfunctional isocyanates used for crosslinking have to be used in excess. Their reaction with water involves decarboxylation and formation of the corresponding amines, which in turn form ureas with isocyanates which have not yet reacted. This urea formation reaction takes place during the drying of the coating material and adversely affects the feel of the coating film, which is still soft directly following application. There was therefore a need to develop a binder for soft feel coating materials which durably retains this soft feel. A further object was to provide a one-component binder which cures at moderate temperature and yet imposes very little restriction on the pot life.

SUMMARY OF THE INVENTION

It has surprisingly been found that polymers having a predominantly aliphatic nature which contain terminal or lateral cyclic carbonate groups, possess the required low glass transition temperature and can be processed to binders in an aqueous, amine-containing dispersion crosslink in a short time and at low temperatures after drying and lead to coatings having the required soft feel without suffering rapid loss of said soft feel. These binders can be formulated as both one-component and two-component coating materials.

The invention therefore provides aqueous binders for soft feel coating materials, comprising predominantly aliphatic, water-soluble or water-dispersible polymers A having terminal or lateral cyclic carbonate groups and an amine B having at least two primary amino groups, the ratio of the number of primary amino groups in the component B to the number of cyclic carbonate groups in the component A being from about 7:3 to about 3:7, preferably from about 6:4 to about 4:6.

DESCRIPTION OF PREFERRED EMBODIMENTS

The term "predominantly aliphatic" refers to those polymers in which the mass fraction of aliphatic units in the sum of the masses of aromatic and aliphatic units is at least about 60%, preferably at least about 70%, and with particular preference at least about 75%.

By terminal cyclic carbonate groups are meant those which are located in each case at the chain end of linear or branched molecules. Lateral cyclic carbonate groups are those which are not located at the end of a chain or chain branch. Preferably, the polymers A contain on average at least about 1.5, with particular preference at least about 2, such cyclic carbonate groups per molecule.

Suitable binder components A are all known classes of aliphatic or predominantly aliphatic polymers which are soluble or dispersible in water and contain cyclic carbonate groups as end groups either as a result of their synthesis or as a result of reaction with a compound which has a cyclic carbonate group and a group which rapidly undergoes reaction with reactive end groups of the polymer. Examples of the latter class of polymers are polyacrylate polyols A11, polyester polyols A12, polyether polyols A13, polyurethane polyols A14 and polyolefin polyols A15 as hydroxyl-containing polymers A1, and polyether amines A21 and polyiminoalkylene amines A22, polyamido amines A23 and polyureas A24 as amino-containing polymers A2. Particular preference is given in this context to polyacrylate polyols A11, polyester polyols A12, polyurethane polyols A14 and polyolefin polyols A15 and also to polyamido amines A23 and polyureas A24. Likewise suitable though less preferred are polymers which contain mercapto groups as reactive groups. In this case the specific molar amount of hydroxyl or amino groups in the polymers A1 and/or A2 in question is in each case preferably from about 0.01 to about 2 mmol/g, and the polymers preferably have on average per molecule in each case at least about 1.5, preferably from about 1.8 to about 2.5, and with particular preference from about 1.9 to about 2.2, functional groups. The conversion of these hydroxyl or amino end groups of the polymers A1 and A2 into cyclic carbonate groups can be carried out, for example and preferably, by reaction with an at least bifunctional isocyanate A3, thereby providing the polymers with isocyanate end groups which are attached to the initial polymer by way of a urethane or urea group. The amount of isocyanates A3 in this case is preferably chosen such that there are on average at least about 1.5 isocyanate groups per molecule of this intermediate. In a subsequent step, these isocyanate-functional polymers can in turn be reacted with a compound A4 having at least one isocyanate-reactive group and one cyclic carbonate group, with particular preference glycerol carbonate (4-hydroxymethyl-1,3-dioxolan-2-one), to give the desired polymer A having cyclic carbonate end groups.

Examples of polymers A5, which have the required cyclic carbonate groups by virtue of their precursors, are reaction products of units having in each case two, preferably terminal, cyclic carbonate groups A51 (which can be prepared, for example, from diepoxides by reaction with carbon dioxide using appropriate catalysis) and diamines A52, the diamines being employed in a substoichiometric proportion.

The glass transition temperature of these polymers A that are suitable for the invention is from about −70 to about −30° C., preferably from about −60 to about −40° C. The polymers A preferably have an acid number of from about 5 to about 200 mg/g, in particular from about 20 to about 150 mg/g. The acid groups are preferably at least partly neutralized (at least about 10%, preferably at least about 25% neutralized). The specific cyclic carbonate group content is preferably from about 0.01 to about 2 mmol/g, with particular preference from about 0.2 to about 1.5 mmol/g.

The polyacrylate polyols A11 can be prepared in conventional manner by free-radically initiated polymerization of mixtures of olefinically unsaturated monomers, the mixture containing a mass fraction of at least about 5%, preferably at least about 10%, of hydroxyl-containing olefinically unsaturated monomers A111 and a mass fraction of at least about 1%, preferably at least about 2%, of olefinically unsaturated carboxylic acids A112. Another variety of the polyacrylate polyols that are suitable for the present invention is obtainable by polymerizing a mixture of olefinically unsaturated monomers which contains no monomers A111 but contains a mass fraction of at least about 2%, preferably at least about 5% and, with particular preference, at least about 8% of olefinically unsaturated carboxylic acids A112, which are reacted before, during or after the polymerization with epoxy compounds to form hydroxyl-containing compounds or polymers. Further monomers A113 which can be used include alkyl esters of olefinically unsaturated carboxylic or dicarboxylic acids, the alkyl groups being selected from linear, branched or cyclic aliphatic radicals having 4 to 18 carbon atoms and the acids being selected from the monocarboxylic acids acrylic and methacrylic acid and also crotonic and isocrotonic acid and vinylacetic acid, and also from maleic and fumaric acid and itaconic, citraconic and mesaconic acid. It is also possible to use monoesters of these unsaturated dicarboxylic acids as monomers A112. Further suitable comonomers A113 are vinylaromatics such as styrene, vinyltoluene and substitution products and homologs of styrene, vinyl esters of saturated aliphatic mono-carboxylic acids, such as vinyl acetate or vinyl propionate, vinyl halides and vinylidene halides, vinyl ethers, and vinyl ketones.

The polyester polyols A12 can be prepared in conventional manner by condensing preferably aliphatic linear, branched or cyclic polyols A112 and preferably aliphatic linear, branched or cyclic polycarboxylic acids A122.

Preferred polyols A121 are aliphatic dihydroxy compounds. It is also possible to use a mass fraction of up to about 20% of polyols having a functionality of three or more (having three or more hydroxyl groups per molecule, such as trimethylolethane and trimethylolpropane, pentaerythritol and sorbitol, for example) in this mixture. Preferably this mass fraction is up to about 10%, with particular preference up to about 5%. Particularly suitable aliphatic polyols A121 are the linear and branched dihydroxy compounds having 2 to 8 carbon atoms, such as glycol, 1,2- and 1,3-propanediol, 1,4-butanediol, 1,6-hexanediol, neopentyl glycol, diethylene glycol, and triethylene glycol. The mass fraction of branched dihydroxy compounds in this case should not exceed about 5%.

Compounds A122 that are used are preferably aliphatic linear, branched or cyclic carboxylic acids, with particular preference dicarboxylic acids. Suitable examples include linear aliphatic dicarboxylic acids having 2 to 40 carbon atoms, such as succinic acid, glutaric acid, adipic acid, pimelic acid and suberic acid, azelaic and sebacic acid, cyclohexanedicarboxylic acids and also the dimeric fatty acids that are obtainable from natural unsaturated fatty acids or mixtures thereof. Aromatic di- and polycarboxylic acids can be added in a minor proportion (mass fraction in the acid component of up to about 40%). Examples thereof are phthalic acid, isophthalic and terephthalic acid, trimellitic acid, trimesic acid, and benzophenone-tetracarboxylic acid.

Instead of or in addition to the compounds A121 and A122 it is also possible to use hydroxy acids A123, preferably hydroxycarboxylic acids having in each case at least one hydroxyl and one acid group, or ester-forming derivatives thereof. Particular preference is given in this context to monohydroxymonocarboxylic acids. Suitable compounds of this class A123 are γ-hydroxybutyric acid, δ-hydroxyvaleric acid, ε-hydroxycaproic acid, lactic acid, and oligoesters and polyesters of said acids, it also being possible for mixtures of these acids to occur in the polyesters. Particular preference is given to the industrially available poly-ε-caprolactone.

The polyester polyols A12 are synthesized preferably in two stages, in the first of which only difunctional polyols A121 are condensed with dibasic aliphatic linear, branched or cyclic carboxylic acids A122 to give a linear polyester having a hydroxyl number of from about 20 to 100, preferably from about 30 to about 70 and, with particular preference, from about 40 to about 60 mg/g. In a second stage, condensation is continued with further polyols A121, it being possible to use polyols having a higher functionality in this stage. At the end of this second stage the hydroxyl number of the polyester is from about 50 to about 200 mg/g, preferably from about 60 to about 160, with particular preference from about 70 to about 130 mg/g. In the third stage, the polyester of the second stage is subsequently reacted with a compound A123 having at least two hydroxyl groups and at least one acid group, and also, if desired, with further polyol A121 to give the adduct A1.

As compounds A123 it is preferred to use aliphatic dihydroxycarboxylic acids such as dimethylolpropionic acid and tartaric acid. It is also possible to employ acids having at least two amino groups or at least one amino and one hydroxyl group, such as 2,4-diaminobutyric acid, for example.

The polyolefin polyols A15 that are suitable in accordance with the invention are obtainable by polymerizing mono- or polyunsaturated aliphatic linear, branched or cyclic compounds and functionalizing the end groups. Particular preference is given to polymers of diunsaturated linear or branched olefins, such as butadiene or isoprene, having hydroxyl end groups.

Within the context of the invention it is possible and preferred to use mixtures of different hydroxyl-containing polymers A1 or amino-containing polymers A2 both with one another and also within the classes A1 and A2.

The polyfunctional isocyanates A3 can be aliphatic, mixed aliphatic-aromatic, or aromatic; preference is given to difunctional aliphatic linear, branched and cyclic isocyanates such as 1,4-diisocyanatobutane, 1,6-diisocyanatohexane, 1,5-diisocyanato-2-methylpentane, 2,2,4- and 2,4,4-trimethyl-1,6-diisocyanatohexane, 1,12-diisocyanatododecane, 1,4-diisocyanatocyclohexane, isophorone diisocyanate, bis(4-isocyanatocyclohexyl)-methane, and also the uretdiones, allophanates and biurets derived from these isocyanates. In a minor proportion (up to about 10% of the mass of the isocyanate component) it is also possible to use isocyanates having a functionality of three or more, such as the isocyanurates derived from said diisocyanates. Less preferred is the use of aromatic or mixed aromatic-aliphatic isocyanates such as tetramethylxylylene diisocyanate, bis(4-isocyanatophenyl)methane, tolylene diisocyanate, and 1,5-diisocyanatonaphthalene.

Suitable compounds A4 having cyclic carbonate groups and at least one isocyanate-reactive group are primarily 1,3-diox(ol)an-2-ones substituted in position 4 by a hydroxyalkyl or aminoalkyl radical. Examples of suitable such compounds are 4-hydroxymethyl-1,3-dioxolan-2-one, 4-aminomethyl-1,3-dioxolan-2-one, 4-(2-hydroxyethyl)-1,3-dioxolan-2-one and other 4-(ω-aminoalkyl)- or 4-(ω-hydroxyalkyl)-1,3-dioxolan-2-ones, and also the corresponding 1,3-dioxan-2-ones.

The acid groups of the polymers A are neutralized by adding amines, preferably tertiary amines, after which the neutralized polymer A can be dispersed in water, establishing a mass fraction of solids of from about 30 to about 70%, preferably from about 45 to about 65%.

The amine B carries at least two primary amino groups. In addition, it may include secondary and tertiary amino groups as well. Suitable amines are aliphatic diprimary linear, branched or cyclic amines having 2 to 40 carbon atoms, such as ethylenediamine, 1,2- and 1,3-propylenediamine, 1,6-diaminohexane, diethylene-triamine, triethylenetetramine, tetraethylenepentamine, and higher polyiminoalkyleneamines.

The soft feel coating materials can be prepared from the binders A preferably such that pigments and, if desired, flatting agents are finely divided in the component A, and this mixture is then formulated with the amine B and, if desired, with a thickener and also with further customary additives to give a ready-to-apply coating material. In the case of such a formulation it is possible with particular preference to add pigments, leveling agents, antifoams, etc. together with the thickener.

In order to modify the surface properties, especially the feel (sensory aspect), it is also possible to add waxes to the coating materials prepared in accordance with the invention, thereby possibly further raising, for example, the scratch resistance of the coating.

The mass fraction of solvent in the finished coating material is typically below about 6, preferably below about 4%.

As already mentioned at the outset, the coating materials obtainable through the invention can be used to produce coatings on hard substrates of all kinds, these coatings feeling superficially soft to the touch and resulting, for example, in nonslip surfaces. These coating materials are particularly suitable for coating plastics, metals, ceramic materials, and glass.

EXAMPLES

The invention is illustrated by the examples below. In these examples, the following definitions are used in addition:

The acid number is defined in accordance with DIN 53 402 as the ratio of that mass $m_{KOH}$ of potassium hydroxide required to neutralize a sample under analysis to the mass $m_B$ of this sample (mass of the solid in the sample in the case of solutions or dispersions); its customary unit is "mg/g".

The hydroxyl number is defined in accordance with DIN 53 240 as the ratio of that mass $m_{KOH}$ of potassium hydroxide having exactly the same number of hydroxyl groups as a sample under analysis to the mass $m_B$ of this sample (mass of the solid in the sample in the case of solutions or dispersions); its customary unit is "mg/g".

The amine number is defined in accordance with DIN 53 176 as the ratio of that mass $m_{KOH}$ of potassium hydroxide which consumes exactly the same amount of acid for neutralization as a sample under analysis to the mass $m_B$ of this sample (mass of the solid in the sample in the case of solutions or dispersions); its customary unit is "mg/g".

The carbonate group content is specified as the specific amount of substance of carbonate groups, said amount of substance of carbonate groups $n(CO_2)$ being divided by the mass of the solid resin m; the customary unit is "mmol/g".

All indications of numbers having the unit "%", unless expressly noted otherwise, are figures for mass fractions (g/100 g).

Example 1

Preparation of a Polyester Polyol A12

A mixture of 32.2 kg of diethylene glycol and 16.42 kg of ethylene glycol was heated to 150° C. with 72 kg of adipic acid with the addition of 330 g of dibutyltin dilaurate. The water which formed was removed azeotropically by adding xylene, the temperature being raised to 220° C. over the course of three hours. The mixture was held at this temperature until an acid number of less than 3 mg/g was reached. The hydroxyl number of the resulting polyester was about 50 mg/g; a viscosity of about 10 Pa·s was measured at 23° C. and a shear gradient of 25 s$^{-1}$.

Example 2

Preparation of a Linear Polyester Dicarbonate 2064 g of the polyester from Example 1 were heated to about 60° C. with 22 g of 1,6-hexanediol, 450 g of N-methylpyrrolidone and 150 g of dimethylolpropionic acid, then 476 g of 1,6-diisocyanatohexane were added over the course of about 30 minutes and the aforementioned temperature was maintained until the mass fraction of isocyanate in the solution had dropped to about 1.6%. Subsequently, 143 g of glycerol carbonate (4-hydroxymethyl-1,3-dioxolan-2-one) were added over the course of 10 minutes at the same temperature and the mixture was left to react for about 4 hours until the isocyanate concentration had fallen to zero.

The product was subsequently neutralized by adding about 66 g of triethylamine and was dispersed in about 3100 g of water to give a fine dispersion having a mass fraction of solids of about 4%. This dispersion had an acid number of about 24 mg/g and a carbonate group content of about 0.41 mmol/g (based in each case on the solids of the dispersion).

Example 3

Preparation of a Branched Polyester Dicarbonate 9.8 kg of the polyester of Example 1 were heated to 60° C. with 345 g of trimethylolpropane, 25 g of glycol, 109 g of 1,6-hexanediol, 2223 g of N-methylpyrrolidone and 741 g of dimethylolpropionic acid. Subsequently, 3339 g of 1,6-diisocyanatohexane were added over about 30 minutes. Stirring was continued at this temperature until the isocyanate concentration in the solution had fallen to a mass fraction of about 2.4%. Subsequently, 1128 g of glycerol carbonate were added; following a reaction time of about 4 hours at about 60° C., the isocyanate concentration had fallen to zero.

For neutralization, 290 g of dimethylethanolamine were added; subsequently, the product was dispersed in 16.4 kg of water to give a fine dispersion having a mass fraction of solids of about 45%. The dispersion had an acid number of about 21 mg/g and a carbonate group content of about 0.62 mmol/g.

Example 4

Preparation of a Cationic Polyester Dicarbonate 3.5 kg of the polyester from Example 1 were heated to about 60° C. with 38 g of 1,6-hexanediol and 228 g of N-methyldiethanolamine; then 813 g of 1,6-diisocyanatohexane were added over the course of 15 minutes at this temperature. After subsequent reaction at this temperature for 30 minutes, 244 g of glycerol carbonate were added. The mixture was stirred at 60° C. until the isocyanate concentration had fallen to zero. The product was then neutralized with 460 g of 10% strength formic acid, after which a fine dispersion having a mass fraction of solids of about 40% was prepared using 7.3 kg of water. The dispersion had an acid number of about 20 mg/g and an amine number of about 22 mg/g. The carbonate group content was about 0.62 mmol/g.

Coating materials comprising the polyester dicarbonates of Examples 2 to 4 are cured by adding a stoichiometric amount of primary amines.

Example 5

Soft Feel Coating Material 1.5 g of diethylenetriamine were added to 164 g of the polyester dicarbonate from Example 2. The resulting clearcoat was knife-coated onto a glass plate and dried at 120° C. for about 30 minutes. This gave a flexible, tack-free and transparent coating film. The surface of the cured coating material is soft to the touch.

Example 6

Soft Feel Coating Material 34.4 g of the polyester dicarbonate from Example 3 were admixed with 0.5 g of a commercial wetting agent (®Additol XL 250 from Vianova Resins) and 0.8 g of a commercial dispersant (®Additol VXW 6208 from Vianova Resins) and also 1.5 g of a carbon black pigment (Spezialschwarz 4 from Degussa AG), and this mixture was homogenized in a bead mill. The curing agent used was a solution of 4.9 g of diethylenetriamine in 30 g of water. The black paint with the curing agent and an additional defoamer (®Additol XW 375) was homogenized for about 20 minutes on a high-speed mixer (dissolver).

The chemical resistance was assessed on the coated steel plates. Under 1000 double rubs with a so-called Crockmeter, little (xylene) or no attack was found in contact with water, xylene, acetone, and dilute ammonia.

Example 7

Mixing of a Polyester Polyol with a Polybutadiene Polyol 10.52 kg of the polyester from Example 1 were mixed with 10.3 kg of a polymer of butadiene having hydroxyl end groups (®Poly-bd R 45 HT from Elf Atochem).

Example 8

Preparation of an Anionic Linear Polyester Urethane 11.9 kg of the mixture from Example 7 were heated to 60° C. with 130 g of 1,6-hexanediol, 2.6 kg of N-methylpyrrolidone and 0.87 kg of dimethylolpropionic acid, then 2.75 kg of 1,6-diisocyanatohexane were added over about 25 minutes and the mixture was held at this temperature until the concentration of isocyanate groups in the solution was about 1.6%. Subsequently, 830 g of glycerol carbonate were added over the course of about 10 minutes and the mixture was held at about 60° C. for 4 hours; thereafter, the isocyanate concentration had fallen to zero. Neutralization was carried out with 0.38 kg of triethylamine, after which the product was dispersed in 18 kg of water to give a fine dispersion having a mass fraction of solids of about 45%. This dispersion had an acid number of about 25 mg/g and a carbonate group content of about 0.41 mmol/g.

Example 9

Mixing of a Polyester with α, ω-Polybutyl Methacrylate Diol 4.63 kg of the polyester from Example 1 were added to a solution of 4.23 kg of a polybutyl methacrylate diol (experimental product BD 2000 from Th. Goldschmidt AG) in N-methylpyrrolidone (mass fraction of solids 27.3%, hydroxyl number about 84 mg/g).

Example 10

Branched Anionic Polyester 4 g of 1,6-hexanediol, 13 g of trimethylolpropane, 1 g of ethylene glycol, 38 g of N-methylpyrrolidone and 27 g of dimethylolpropionic acid were added to 323 g of the mixture from Example 9 and the mixture was heated to 60° C. Then 122 g of 1,6-diisocyanatohexane were added and the mixture was held at 60° C. until the isocyanate concentration was constant at 2.8% (based on the mass of the solution). At constant temperature, 41 g of glycerol carbonate were added and the mixture was held at this temperature for 4 hours until the isocyanate concentration had fallen to zero.

For neutralization, 11 g of dimethylethanolamine were added, after which the mixture was dispersed in 0.5 kg of water to give a fine dispersion having a mass fraction of solids of about 45%. The acid number was about 24 mg/g and the carbonate group content about 0.71 mmol/g.

Example 11

Soft Feel Coating Materials

Using the polymer dispersions of Examples 7 to 10, clearcoats were prepared in accordance with the procedure of Example 6 by adding triethylenetetramine and were applied to steel plates. Drying resulted in all case in a flexible tack-free coating film which showed no aftercuring. The chemical resistance was good in all cases.

The above description of the invention is intended to be illustrative and not limiting. Various changes or modifications in the embodiments described herein may occur to those skilled in the art. Those change can be made without departing form the scope or spirit of the invention.

What we claim is:

1. An aqueous binder for soft feel coating materials comprising predominantly aliphatic water-soluble or water-dispersible polymers A having terminal or lateral cyclic carbonate groups and an amine B having at least two primary amino groups, wherein the ratio of the number of primary amino groups in the component B to the number of cyclic carbonate groups in the component A is from about 7:3 to about 3:7, and wherein the polymers A are obtained by reacting compounds A4 which contain a cyclic carbonate group and an isocyanate-reactive group with the reaction product of a polyfunctional isocyanate A3 having at least two isocyanate groups and a predominantly aliphatic polymer selected from hydroxyl-containing polymers A1 and amino-containing polymers A2, said isocyanate A3 present used in an amount such that the reaction product contains on average at least about 1.5 isocyanate groups for molecule.

2. An aqueous binder for soft feel coating materials, as claimed in claim 1, wherein the hydroxyl-containing polymers A1 are selected from polyacrylate polyols A11, polyester polyols A12, polyurethane polyols A14, and polyolefin polyols A15.

3. An aqueous binder for soft feel coating materials, as claimed in claim 1, wherein the amino-containing polymers are selected from polyamido amines A23 and polyureas A24.

4. An aqueous binder for soft feel coating materials, as claimed in claim 1, wherein the polyfunctional isocynates A3 are 1,4-diisocyanatobutane, 1,6-diisocyanatohexane, 1,5-diisocyanato-2-methylpentane, 2,2,4- and 2,4,4-trimethyl-1,6-diisocyanatohexane, 1,12-diisocyanatododecane, 1,4-diisocyanatocyclohexane, isophorone diisocyanate, bis(4-isocyanatocyclohexyl)-methane, and the uretdiones, allophanates and biurets derived from these isocyanates or are tetramethylxylylene diisocyanate, bis(4-isocyanatophenyl)methane, tolylene diisocyanate, and 1,5-diisocyanatonaphthalene.

5. An aqueous binder for soft feel coating materials, as claimed in claim 1, where compounds A4 which contain a cyclic carbonate group and an isocyanate-relative group are selected from the group consisting of 4-hydroxymethyl-1,3-dioxolan-2-one, 4-aminomethyl-1,3-dioxolan-2-one, 4-(2-hydroxyethyl)-1,3-dioxolan-2-one.

6. An aqueous binder for soft feel coating materials, as claimed in claim 1, wherein the polymers A have an acid number of from about 5 to about 200 mg/g and a specific cyclic carbonate group content of from about 0.2 to about 1.5 mmol/g.

7. An aqueous binder for soft feel coating materials, as claimed in claim 1, wherein said amines B are primary aliphatic linear diamines having 2 to 40 carbon atoms.

8. An aqueous binder for soft feel coating materials, as claimed in claim 7, wherein the diamines are selected from the group consisting of ethylenediamine, diethylenetriamine, triethylenetetramine, and tetraethylene-pentamine.

9. An aqueous binder for soft feel coating materials as claimed in claim 1, wherein the polymers A have a glass transition temperature from about −70° C. to about −30° C.

10. An aqueous binder for soft feel coating materials as claimed in claim 1, wherein the polymers A have an acid number of from 5 to 200 mg/g and a specific cyclic carbonate group content of from 0.2 to 1.5 mmol/g.

11. A coating composition having soft feel characteristics which comprises a binder according to claim 1.

12. A method for coating a hard substrate which comprises applying to said substrate a soft feel coating composition according to claim 11.

13. The method as claimed 11, wherein the substrate is plastics, metals, ceramics and glass.

* * * * *